United States Patent

Mikami

[11] Patent Number: 5,940,764
[45] Date of Patent: Aug. 17, 1999

[54] PHS TERMINAL DISABLING SYSTEM

[75] Inventor: Hirofumi Mikami, Tokyo, Japan

[73] Assignee: NEC Corporation, Tokyo, Japan

[21] Appl. No.: 08/703,958

[22] Filed: Aug. 28, 1996

[51] Int. Cl.[6] .................................................. H04Q 7/20
[52] U.S. Cl. ........................ 455/456; 455/409; 455/403
[58] Field of Search .................................. 455/405, 422, 455/435, 456, 457, 550, 565, 524, 433, 432, 414, 409, 406

[56] References Cited

U.S. PATENT DOCUMENTS

| | | | |
|---|---|---|---|
| 4,639,726 | 1/1987 | Ichikawa et al. | 340/825.44 |
| 5,128,981 | 7/1992 | Tsukamoto et al. | 455/450 |
| 5,159,625 | 10/1992 | Zicker | 455/432 |
| 5,335,265 | 8/1994 | Cooper et al. | 379/59 |
| 5,335,278 | 8/1994 | Matchett et al. | 380/23 |
| 5,442,805 | 8/1995 | Sagers et al. | 455/33.1 |
| 5,457,736 | 10/1995 | Cain et al. | 455/439 |
| 5,473,671 | 12/1995 | Partridge, III | 455/445 |
| 5,535,431 | 7/1996 | Grube et al. | 455/411 |
| 5,568,153 | 10/1996 | Beliveau | 342/457 |
| 5,602,837 | 2/1997 | Takahashi | 370/280 |
| 5,734,978 | 3/1998 | Hayatake et al. | 455/410 |

FOREIGN PATENT DOCUMENTS

| | | |
|---|---|---|
| 3-100894 | 4/1991 | Japan . |
| 3-166895 | 7/1991 | Japan . |
| 4-104625 | 4/1992 | Japan . |
| 4-324724 | 11/1992 | Japan . |
| 8-9824 | 9/1994 | Japan . |
| 8-98247 | 9/1994 | Japan . |
| 2 253 968 | 9/1992 | United Kingdom . |
| 2 296 409 | 6/1996 | United Kingdom . |
| 95/26115 | 9/1995 | WIPO . |

*Primary Examiner*—Dwayne D. Bost
*Assistant Examiner*—William G. Trost
*Attorney, Agent, or Firm*—Foley & Lardner

[57] ABSTRACT

It is an object of the present invention to realize a PHS terminal disabling system which can improve the recovery rate of lent PHS terminals. The PHS terminal disabling system includes a PHS terminal, a plurality of cell sites for communicating with the PHS terminal, and an exchange for performing an exchanging operation of the PHS terminal via the cell sites. The PHS terminal disabling system further includes a data base for holding, as management data for the PHS terminal, position information representative of a position of the PHS terminal and available area information representative of an area within which the use of the PHS terminal is permitted, and a main control apparatus connected to the exchange and the data base for updating the position information of the PHS terminal with a current position of the PHS terminal represented by data received from any cell site via the exchange and for causing, when the position of the PHS terminal is not included in the area represented by the available area information, the exchange to perform no exchanging operation.

3 Claims, 2 Drawing Sheets position information 6A permission/inhibition information 6B available area information 6C

PHS TERMINAL DISABLING SYSTEM

BACKGROUND OF THE INVENTION

1. Field of the Invention

This invention relates to a management system for a personal handyphone system (hereinafter referred to as PHS) terminal, and more particularly to a PHS terminal disabling system for disabling or invalidating the use of a PHS terminal.

2. Description of the Related Art

A communication system in which PHS terminals are used includes cell sites which communicate with a PHS terminal by means of radio waves, an exchange connected to the cell site, and a data base which is connected to the exchange and holds management data for the PHS terminals.

Conventionally, a PHS terminal is disabled by manually changing the management data for the PHS terminal on the data base from a use permitting condition to a use inhibiting condition.

PHS terminals are frequently lent owing to their portability, and such disabling processing as described above is performed also for a PHS terminal which is not recovered even after the lending term expires.

A system is disclosed in Japanese Patent Laid-Open Application No. Heisei 3-100894 wherein, when a portable terminal is stolen, the theft is manually notified to a host computer, and then, the host computer transmits an identification number of the stolen portable terminal and a code representative of such theft to the portable terminal so that the stolen portable terminal invalidates, upon reception of the notification, a key inputting operation thereof.

Another system is disclosed in Japanese Patent Laid-Open Application No. Heisei 4-104625 wherein an owner of a portable terminal which has been stolen or lost sends a transmission inhibition code to the portable terminal to inhibit a transmission operation of the portable terminal.

A disabling operation of a portable terminal in the prior art systems described above is performed manually and limits the use of the portable terminal with respect to the time but does not restrict the available area in which the portable terminal can be used.

PHS terminals are lent in most cases in a limited space of an exhibition hall or a like place, and where the limitation in use of a portable terminal is performed with respect to the time as described above, since a portable terminal can be used also outside the exhibition hall, a person to whom a portable terminal has been lent likely forgets to return the portable terminal. Thus, the conventional systems described above are disadvantageous in that the recovery rate when portable terminals are lent is low.

SUMMARY OF THE INVENTION

The present invention has been made in view of the problem of the prior art systems described above, and it is an object of the present invention to provide a PHS terminal disabling system which can raise the recovery rate of lent PHS terminals by limiting the area of use of a PHS terminal.

According to the present invention, a PHS terminal disabling system for a personal handyphone system which includes a PHS terminal, a plurality of cell sites for communicating with the PHS terminal, and an exchange for performing an exchanging operation of the PHS terminal via the cell sites, is characterized in that it comprises a data base for holding, as management data for the PHS terminal, position information representative of a position of the PHS terminal, available area information representative of one or more of the cell sites provided in an area within which the use of the PHS terminal is permitted, and permission/inhibition information representative of whether the use of the PHS terminal is permitted or inhibited, and a main control apparatus connected to the exchange and the data base for updating the position information of the PHS terminal with a current position of the PHS terminal represented by data received from any of the cell sites via the exchange and for setting, when the position of the PHS terminal is included in an area represented by the available area information, the permission/inhibition information so as to represent permission and causing the exchange to perform an ordinary exchanging operation, but setting, when the position of the PHS terminal is not included in the area represented by the available area information, the permission/inhibition information so as to represent inhibition and causing the exchange to perform no exchanging operation.

The PHS terminal disabling system may be constructed such that it further comprises a message sending apparatus for storing a message to notify that use of the PHS terminal is inhibited, and the main control apparatus sends out, when a call is originated from or terminated at the PHS terminal while the permission/inhibition information represents inhibition, the message stored in the message sending apparatus to the PHS terminal or a terminal from which the call has been terminated at the PHS terminal via the exchange.

In the PHS terminal disabling system of the present invention having the construction described above, no exchanging operation is performed if a call is not originated from or terminated at any cell site provided in the area represented by the available area information of the data base. Since any PHS terminal can be automatically set to a valid or invalid condition based on the location of the PHS terminal, the available area of the PHS terminal can be limited suitably.

DETAILED DESCRIPTION OF THE PREFERRED EMBODIMENT

An embodiment of the present invention is described below with reference to the drawings.

Figure 1:
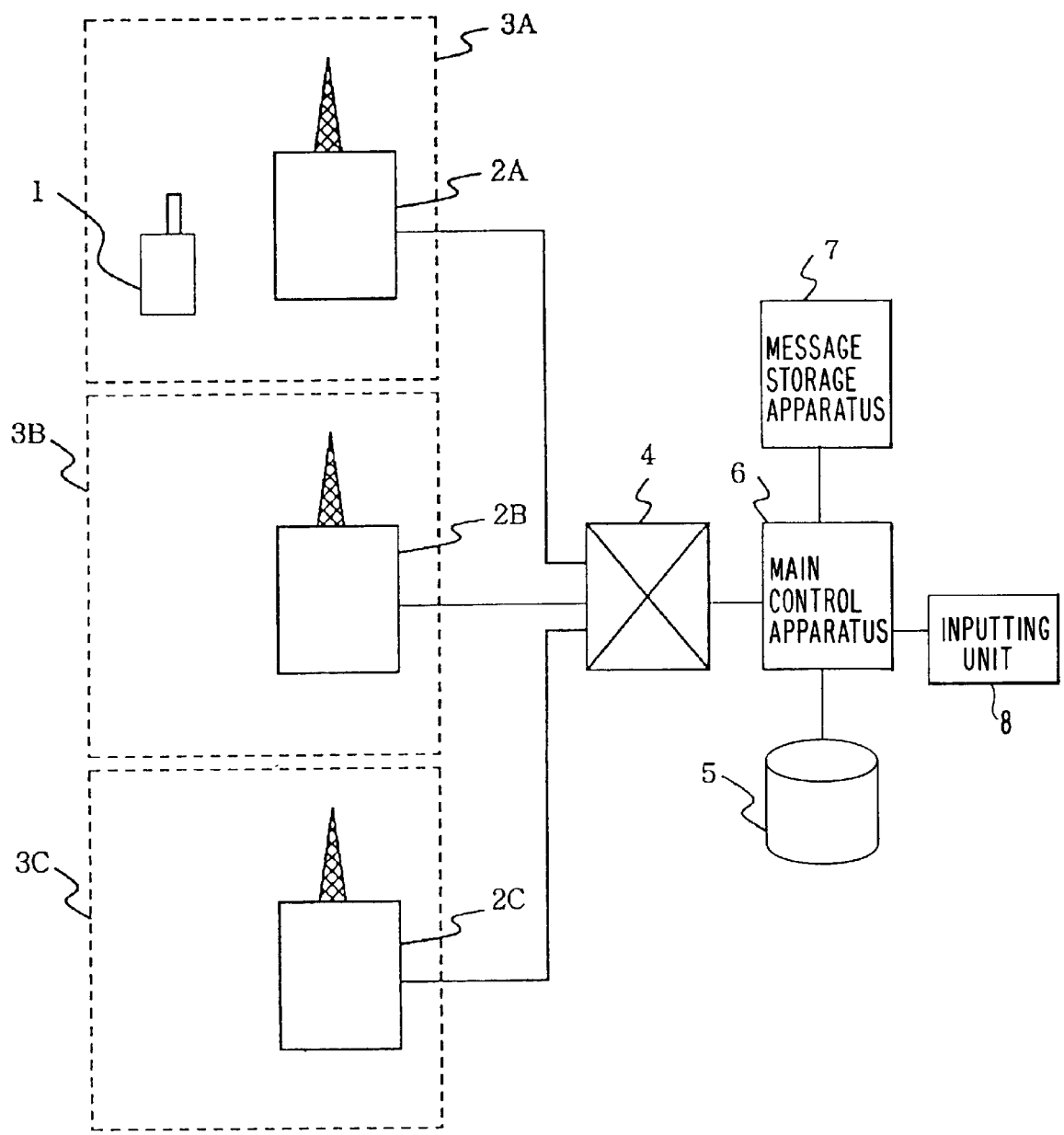
FIG. 1 is a block diagram showing a construction of an embodiment of the present invention.

FIG. 1 is a block diagram showing a construction of an embodiment according to the present invention. The present embodiment includes PHS terminal 1, cell sites 2A, 2B and 2C which communicate with PHS terminal 1 by means of radio waves, exchange 4 connected to cell sites 2A to 2C, data base 5, message storage apparatus 7, and main control apparatus 6 connected to exchange 4, data base 5 and message storage apparatus 7 for referring to stored contents of data base 5 and controlling an exchanging operation of exchange 4 in accordance with the stored contents.

Figure 2:
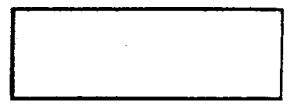
FIG. 2 is a diagrammatic view illustrating management information regarding a PHS terminal stored in data base 5 in the embodiment shown in FIG. 1.
Figure 2:
Figure 2:
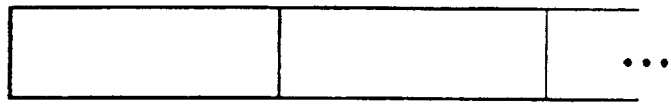

Cell sites 2A to 2C are located in management areas 3A to 3C, respectively. Data base 5 stores management data for PHS terminal 1 and particularly stores, as illustrated in FIG. 2, position information 6A representative of a current position of PHS terminal 1, use permission/inhibition information 6B, and available area information 6C which represents a list of cell sites which can be utilized by PHS terminal 1.

Available area information 6C stored in data base 5 is set in accordance with inputted contents to inputting means 8 by main control apparatus 6. On the other hand, position information 6A and use permission/inhibition information 6B are set in accordance with data sent thereto from cell sites 2A to 2C via exchange 4 by main control apparatus 6. The stored contents of data base 5 are updated at any time.

Message storage apparatus 7 stores a message representing that the use of PHS terminal 1 is inhibited and other messages. Main control apparatus 6 reads out a suitable message stored in message storage apparatus 7 in accordance with a condition of PHS terminal 1 and sends out the message to a user of PHS terminal 1 or a calling person to PHS terminal 1 via exchange 4.

Operation of the embodiment having the construction described above is described below.

It is assumed that the available area of PHS terminal 1 is set to the management areas of cell sites 2A and 2B, that is, to management areas 3A and 3B and this is described in available area information 6C. The current position of PHS terminal 1 is supervised from detection sensitivities of cell sites 2A, 2B and 2C by main control apparatus 6, and the position information is stored as position information 6A in data base 5.

Main control apparatus 6 determines stored contents of use permission/inhibition information 6B based on position information 6A and available area information 6C. If the current position of PHS terminal 1 represented by position information 6A is within management areas 3A and 3B represented by available area information 6C, use permission/inhibition information 6B is set so as to represent that the use of PHS terminal 1 is permitted. However, if the current position of PHS terminal 1 represented by position information 6A is outside management areas 3A and 3B represented by available area information 6C, then use permission/inhibition information 6B is set so as to represent that the use of PHS terminal 1 is inhibited.

Accordingly, if PHS terminal 1 is positioned within management area 3A or 3B, use permission/inhibition information 6B represents that the use of PHS terminal 1 is permitted, but if PHS terminal 1 is within management area 3C, use permission/inhibition information 6B represents that the use of PHS terminal 1 is inhibited.

If a call originating operation is performed by PHS terminal 1, then main control apparatus 6 refers to the stored contents of use permission/inhibition information 6B in data base 5 and, if the stored contents represent that the use of PHS terminal 1 is permitted, then it controls exchange 4 to perform ordinary transmission processing. On the contrary if the stored contents of use permission/inhibition information 6B represent that the use of PHS terminal 1 is inhibited, then main control apparatus 6 reads out from message storage apparatus 7 a message notifying that the use of PHS terminal 1 is inhibited, for example, a message "You are outside an area in which the telephone can be used.", and sends the message to PHS terminal 1 via exchange 4.

If a call is terminated at PHS terminal 1, then main control apparatus 6 inquires from data base 5 through exchange 4 about whether the use of PHS terminal 1 is permitted or inhibited, and, if the use of PHS terminal 1 is permitted, then main control apparatus 6 controls exchange 4 to perform ordinary call terminating processing. On the contrary, if the stored contents of use permission/inhibition information 6B represent that the use of PHS terminal 1 is inhibited, then main control apparatus 6 reads out from message storage apparatus 7 a message to notify that the use of PHS terminal 1 is inhibited, for example, a message "The terminal you are calling is outside an available area." and sends out the message to the call originating terminal through exchange 4.

Since the present invention has the construction described above, the area for use of a PHS terminal can be limited, and consequently, there is an advantage that the recovery rate of lent PHS terminals can be raised. This advantage is particularly effective where PHS terminals are lent while limiting the area available to them.

Further, the advantage described above is improved where a message notifying that a PHS terminal is outside an available area is sent out to the PHS terminal (or another terminal from which a call to the PHS has been originated).

What is claimed is:

1. A PHS terminal disabling system for a personal handyphone system which includes a PHS terminal, a plurality of cell sites for communicating with said PHS terminal, and an exchange for performing an exchanging operation of said PHS terminal via said cell sites, comprising:

an inputting unit for inputting an instruction concerning which ones of said plurality of cells sites that said PHS terminal is permitted to make and receive calls in;

a data base for holding, as management data for said PHS terminal, position information representative of a position of said PHS terminal, available area information representative of one or more of said cell sites provided in an area within which the use of said PHS terminal is permitted, and permission/inhibition information representative of whether the use of said PHS terminal is inhibited; and a main control apparatus connected to said exchange and said data base for updating the position information of said PHS terminal with a current position of said PHS terminal represented by data received from any of said cell cites via said exchange and for setting, when the position of said PHS terminal is included in an area represented by the available area information, the permission/inhibition information so as to represent permission and causing said exchange to perform an ordinary exchanging operation, and setting, when the position of said PHS terminal is not included in the area represented by the available area information, the permission/inhibition information so as to represent inhibition and causing said exchange to perform no exchanging operation, wherein the available area information is stored in said data base in accordance with the instruction inputted through the inputting unit, wherein the position information and the permission/inhibition information are stored in said data base in accordance with the data received from said any of said cell sites connected to said main control apparatus through said exchange, and wherein the inputting unit is located separate from the PHS terminal, and wherein an operator of the PHS terminal does not have authority to input the instruction.

2. A PHS terminal disabling system as set forth in claim 1, further comprising:

a message sending apparatus for storing a message to notify that use of said PHS terminal is inhibited, wherein said main control apparatus sends out, when a call is originated from or terminated at said PHS terminal when the permission/inhibition information represents inhibition, the message stored in said message sending apparatus to said PHS terminal or a terminal from which the call has been terminated at said PHS terminal via said exchange.

3. A PHS terminal disabling system as set forth in claim 1, wherein the inputting unit provides information directly to the main control apparatus, and wherein the main control apparatus communicates with the PHS terminal through the exchange.

* * * * *